US012437712B1

(12) United States Patent
Liao et al.

(10) Patent No.: US 12,437,712 B1
(45) Date of Patent: Oct. 7, 2025

(54) DRIVING CIRCUIT

(71) Applicant: PlayNitride Display Co., Ltd., MiaoLi County (TW)

(72) Inventors: Kuan-Yung Liao, MiaoLi County (TW); Cheng-Chi Lo, MiaoLi County (TW)

(73) Assignee: PlayNitride Display Co., Ltd., MiaoLi County (TW)

( * ) Notice: Subject to any disclaimer, the term of this patent is extended or adjusted under 35 U.S.C. 154(b) by 0 days.

(21) Appl. No.: 18/774,937

(22) Filed: Jul. 17, 2024

(51) Int. Cl.
*G09G 3/32* (2016.01)

(52) U.S. Cl.
CPC ....... *G09G 3/32* (2013.01); *G09G 2310/0264* (2013.01); *G09G 2310/08* (2013.01); *G09G 2330/021* (2013.01)

(58) Field of Classification Search
CPC ....... G09G 2310/0264; G09G 2310/08; G09G 2330/021; G09G 3/32
See application file for complete search history.

(56) References Cited

U.S. PATENT DOCUMENTS

2006/0145968 A1* 7/2006 You ...................... G09G 3/3233 345/76
2008/0180364 A1* 7/2008 Kim ..................... G09G 3/3233 345/76
2020/0219435 A1 7/2020 Chen et al.
2021/0056900 A1 2/2021 Kuo et al.
2021/0210012 A1* 7/2021 Zhang .................. G09G 3/3233
2022/0122524 A1 4/2022 Cho et al.

FOREIGN PATENT DOCUMENTS

| | | |
|---|---|---|
| CN | 115050307 | 9/2022 |
| CN | 115472126 | 12/2022 |
| TW | 202429166 | 7/2024 |

OTHER PUBLICATIONS

"Office Action of Taiwan Counterpart Application", issued on Apr. 15, 2025, p. 1-p. 6.

* cited by examiner

*Primary Examiner* — Muhammad N Edun
(74) *Attorney, Agent, or Firm* — JCIPRNET

(57) ABSTRACT

A driving circuit includes a first driving transistor and a second driving transistor. The first transistor has a first end to receive a power voltage, a control end of the first driving transistor receives a first control signal, and a second end of the first driving transistor is coupled to a light emitting component. The second transistor has a first end to receive a power voltage, a control end of the second driving transistor receives a second control signal, and a second end of the second driving transistor is coupled to the light emitting component. The first transistor provides a first driving current to the light emitting component according to the first control signal, and the second transistor provides a second driving current to the light emitting component according to the second control signal.

14 Claims, 5 Drawing Sheets

DRIVING CIRCUIT

BACKGROUND

Technical Field

This disclosure relates to a driving circuit, and in particular to a driving circuit that can reduce power consumption.

Description of Related Art

With the advancement of electronic technology, it has become an inevitable trend to install high-performance displays in electronic devices. On the other hand, with the rising awareness of environmental protection, providing displays that can reduce power consumption has become an important issue for engineers in this field.

SUMMARY

The disclosure provides a driving circuit, capable of effectively reducing required power consumption.

The driving circuit of the disclosure includes a first driving transistor and a second driving transistor. The first driving transistor has a first end to receive a power voltage, a control end of the first driving transistor receives a first control signal, and a second end of the first driving transistor is coupled to a light emitting component. The second driving transistor has a first end to receive a power voltage, a control end of the second driving transistor receives a second control signal, and a second end of the second driving transistor is coupled to the second end of the first driving transistor. The first driving transistor provides a first driving current to the light emitting component according to the first control signal, and the second driving transistor provides a second driving current to the light emitting component according to the second control signal.

Based on the above, the disclosure provides the driving current to the light emitting component separately or simultaneously through multiple parallel driving transistors. When multiple driving transistors are turned on, by reducing amount of the driving current required by each driving transistor, a voltage difference between the two ends of the each driving transistor may be less than a threshold voltage thereof, effectively reducing the required power consumption by the driving transistor.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate example embodiments of the disclosure and, together with the description, serve to explain the principles of the disclosure.

DESCRIPTION OF THE EMBODIMENTS

Figure 1:
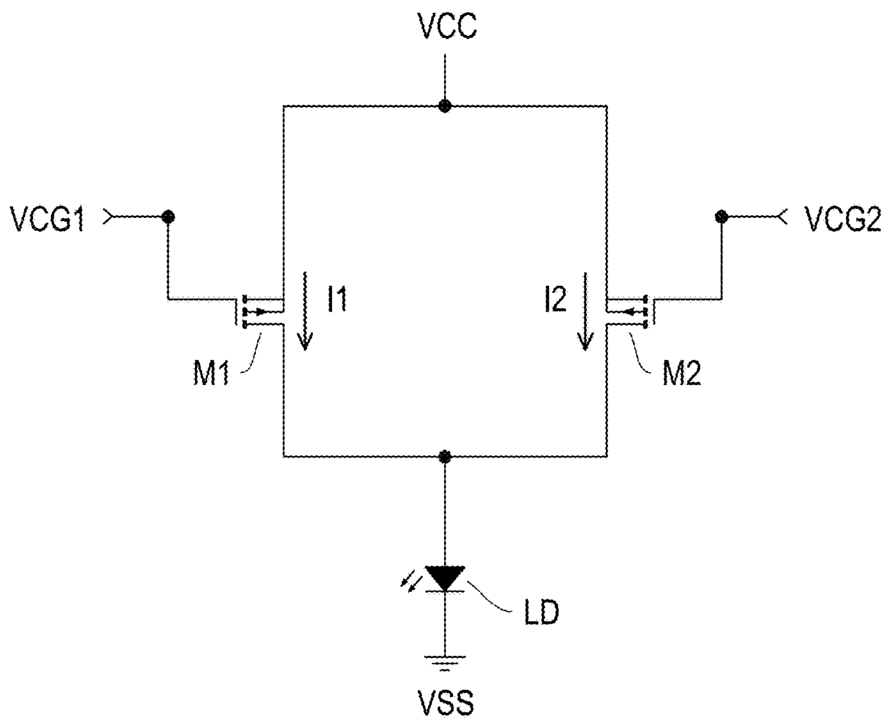
FIG. 1 is a schematic diagram of a driving circuit according to an embodiment of the disclosure.

Referring to FIG. 1, FIG. 1 is a schematic diagram of a driving circuit according to an embodiment of the disclosure. A driving circuit includes driving transistors M1 and M2. A first end of the driving transistor M1 is configured to receive a power voltage VCC; a control end of the driving transistor M1 receives a control signal VCG1; a second end of the driving transistor M1 can be coupled to a light emitting component LD. A first end of the driving transistor M2 is configured to receive the power voltage VCC; a control end of the driving transistor M2 receives a control signal VCG2; a second end of the driving transistor M2 can be coupled to the light emitting component LD.

In this embodiment, the driving transistors M1 and M2 are connected in parallel. When the driving transistor M1 is turned on according to the control signal VCG1, the driving transistor M1 can provide a driving current I1 to the light emitting component LD. When the driving transistor M2 is turned on according to the control signal VCG2, the driving transistor M2 can provide a driving current I2 to the light emitting component LD. In different driving states, the driving transistors M1 and M2 can be turned off at the same time; one of the driving transistors M1 and M2 is turned on while the other one is turned off; or, the driving transistors M1 and M2 can be turned on at the same time.

When the driving transistors M1 and M2 are turned off at the same time, the driving transistors M1 and M2 do not provide the driving current to the light emitting component LD, and the light emitting component LD does not emit light at this time. When one of the driving transistors M1 and M2 is turned on and the other one is turned off, it can mean that the light emitting component LD needs to provide relatively low brightness. At this time, the turned-on driving transistor (the driving transistor M1 or M2) can provide the corresponding driving current (the driving current I1 or I2) to the light emitting component LD, so that the light emitting component LD maintains a low-brightness lighting state. When both the driving transistors M1 and M2 are turned on, the driving transistors M1 and M2 can generate the driving current ID1 and ID2 respectively, and jointly provide the driving current I1 and 12 to the light emitting component LD.

In the driving state where the driving transistors M1 and M2 jointly supply the driving currents I1 and 12 to the light emitting component LD, due to a shunt effect of the driving transistors M1 and M2, values of the driving currents I1 and 12 that flow through the driving transistors M1 and M2, respectively, may be effectively reduced when the light emitting component LD produces a set brightness.

In this embodiment, the driving transistors M1 and M2 may be P-type transistors. A value of the driving current I1 is negatively related to a value of the control signal VCG1, and a value of the driving current I2 is negatively related to a value of the control signal VCG2. In addition, the control signals VCG1 and VCG2 may be the same signal or may be different signals, without certain restrictions. Moreover, the light emitting component LD in this embodiment can be any form of light emitting diode, such as a micro light emitting diode, an organic light emitting diode. An anode of the light emitting component LD is coupled to the second ends of the driving transistor M1 and M2 that are coupled to each other, and a cathode of the light emitting component LD is coupled to a reference ground end VSS.

Figure 2:
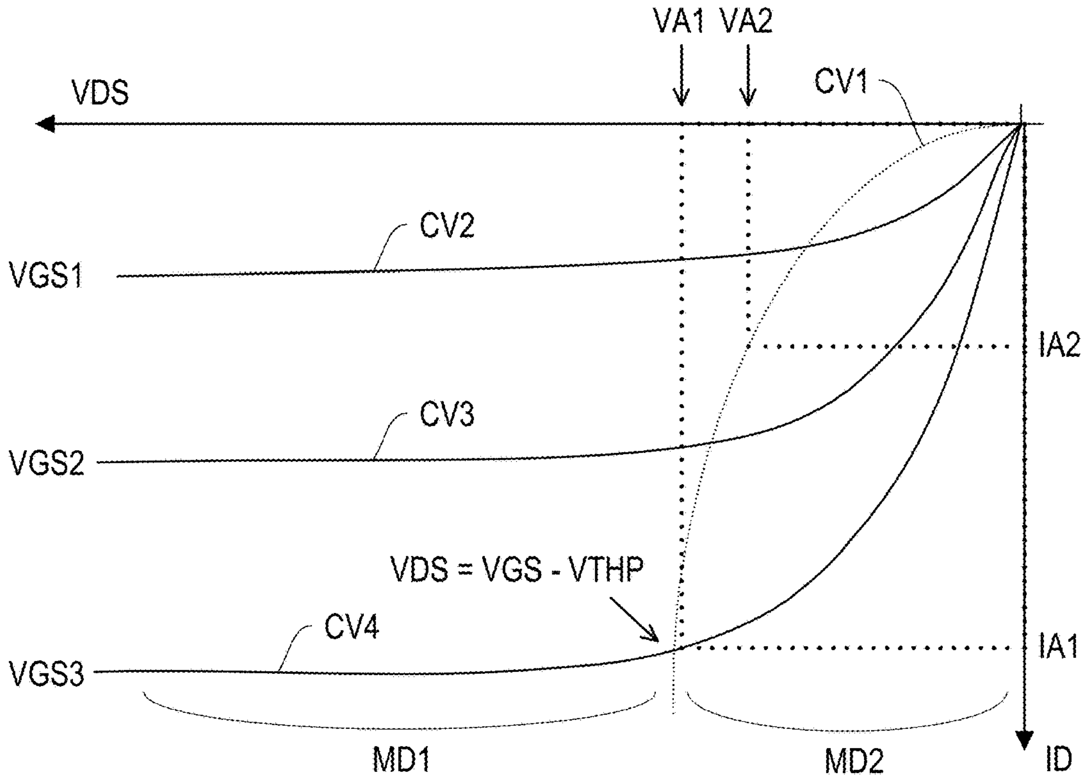
FIG. 2 shows characteristic curves of a driving transistor of the disclosure.

Referring to FIG. 2, FIG. 2 shows characteristic curves of a driving transistor of the disclosure. The horizontal axis of FIG. 2 is a voltage difference VDS between two ends of each driving transistor, and the vertical axis is the driving current ID generated by the each driving transistor. A curve CV1 is a critical curve of areas MD1 and MD2. The area MD1 indicates that the each driving transistor operates in a saturation mode, and the area MD2 indicates that the each driving transistor M1 and M2 operates in a triode mode. Curves CV2 to CV4 are the driving current ID1, ID2, and ID3 provided by the each driving transistor when voltages on the control ends of the each driving transistor are voltage values VGS1, VGS2, and VGS3 respectively.

In this embodiment, the driving transistor can be a P-type transistor, and the voltage values VGS1 to VGS3 can all be negative values, and VGS1>VGS2>VGS3.

In this embodiment, if the driving transistor needs to provide a relatively large driving current IA1, the voltage difference VDS between the two ends of the driving transistor can be a voltage VA1. On the contrary, if the driving transistor needs to provide a relatively small driving current IA2, the voltage difference VDS between the two ends of the driving transistor can be a voltage VA2. The voltage VA2 can be smaller than the voltage VAL.

It can be seen that in this embodiment, providing the driving current to the light emitting component through two or more transistors may reduce amount of the driving current provided by a single driving transistor. In this way, the voltage difference between the two ends of each transistor may be effectively reduced, and power consumption required by the driving transistor may be effectively reduced. The total power consumption of two or more driving transistors is also lower than the power consumption of a single driving transistor.

Incidentally, in this embodiment, the voltage difference between the first end and the second end of any driving transistor in the driving circuit can be greater than a threshold voltage of the driving transistor.

In FIG. 2, the voltage difference VDS (e.g., equal to the voltage VA1) between the first and second ends of the each driving transistor is exactly equal to the voltage difference VGS between the control end and the second end of the each driving transistor M1 and M2 minus a threshold voltage VTHP of the each driving transistor M1 and M2 at a junction of the corresponding areas MD2, MD1, i.e., the curve CV1.

Figure 3:
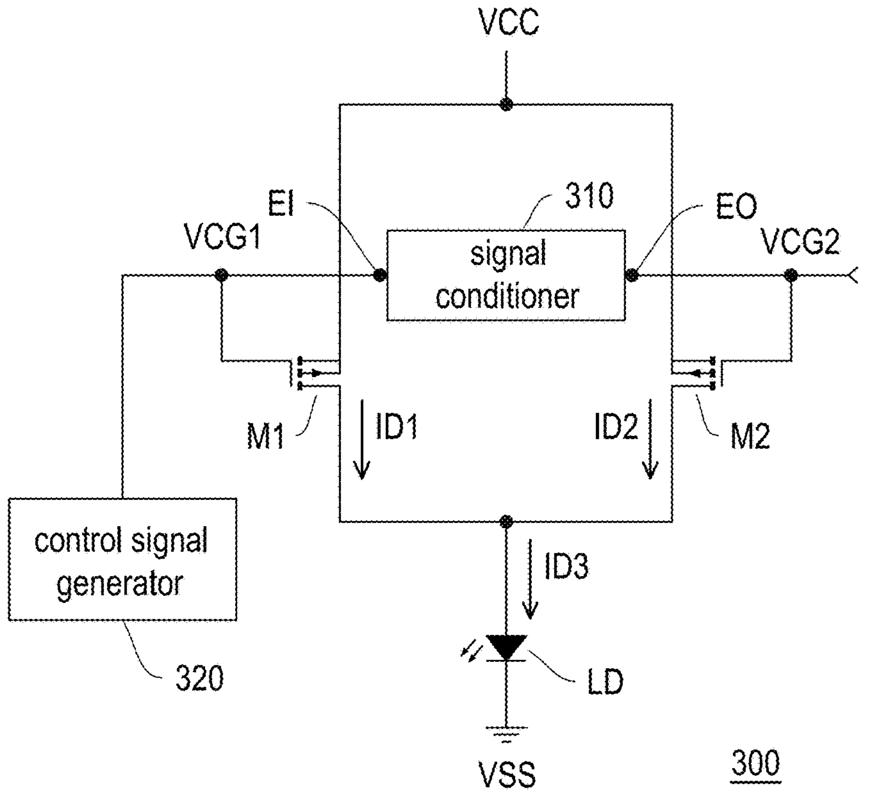
FIG. 3 is a schematic diagram of a driving circuit according to an embodiment of the disclosure.

Referring to FIG. 3, FIG. 3 is a schematic diagram of a driving circuit according to an embodiment of the disclosure. A driving circuit 300 includes the driving transistors M1 and M2, a signal conditioner 310, and a control signal generator 320. The first end of the driving transistor M1 is configured to receive the power voltage VCC; the control end of the driving transistor M1 receives the control signal VCG1; the second end of the driving transistor M1 can be coupled to the light emitting component LD. The first end of the driving transistor M2 is configured to receive the power voltage VCC; the control end of the driving transistor M2 receives the control signal VCG2; the second end of the driving transistor M2 can be coupled to the light emitting component LD. When the driving transistors M1 and M2 are turned on, the driving transistors M1 and M2 can generate the driving current ID1 and ID2 respectively, and jointly provide the driving current ID3 to the light emitting component LD.

In addition, the signal conditioner 310 is coupled between the control ends of the driving transistors M1 and M2. An input end EI of the signal conditioner 310 receives the control signal VCG1, and an output end EO of the signal conditioner 310 generates the control signal VCG2. In this embodiment, the signal conditioner 310 may provide a time delay and generate the control signal VCG2 by delaying the control signal VCG1.

In response to the delay effect of the control signals VCG1 and VCG2, the activation of the driving transistors M1 and M2 can be performed sequentially. In this embodiment, the driving transistor M1 may be activated in priority to the driving transistor M2. Accordingly, the driving transistors M1 and M2 may activate the supply actions of the driving current ID1 and ID2 in a time division manner to prevent the light emitting component LD from generating inrush current. In some embodiments, when the light emitting component LD is to emit light at low brightness, during the time interval when the driving transistor M1 is turned on with priority over the driving transistor M2, only the driving transistor M1 generates power consumption, while the driving transistor M2 is turned off without generating power consumption, which may achieve the effect of reducing the power consumption of the overall driving circuit.

In this embodiment, the control signal generator 320 may generate the control signal VCG1 according to a command signal of a brightness value to be generated by the light emitting component LD. The command signal can be a digital value, and the control signal generator 320 can generate the control signal VCG1 through a digital-to-analog conversion mechanism. Of course, the command signal can also be an analog signal, and the control signal generator 320 can generate the control signal VCG1 with a pulse wave by adjusting the amplitude or waveform of the command signal.

Figure 4A:
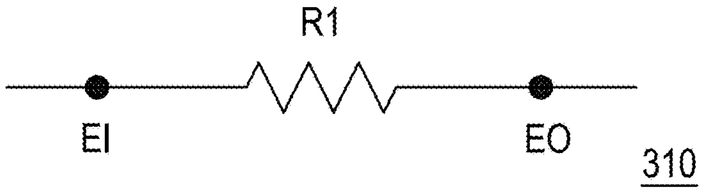
FIG. 4A and FIG. 4B show schematic diagrams of different implementations of a signal conditioner 310 in the embodiment disclosed in FIG. 3, respectively.
Figure 4B:
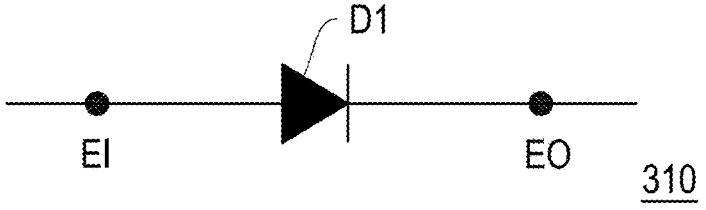

Referring to FIG. 4A and FIG. 4B, FIG. 4A and FIG. 4B show schematic diagrams of different implementations of a signal conditioner 310 in the embodiment disclosed in FIG. 3, respectively. In FIG. 4A, the signal conditioner 310 may be disposed by one or more resistors R1. The resistor R1 may be coupled between the input end EI and the output end EO of the signal conditioner 310. When the signal conditioner 310 has multiple resistors, the resistors may be connected in series between the input end EI and the output end EO of the signal conditioner 310.

In FIG. 4B, the signal conditioner 310 may be disposed by one or more diodes D1. An anode of the diode D1 can be coupled to the input end EI of the signal conditioner 310, and a cathode of the diode D1 can be coupled to the output end EO. When the signal conditioner 310 has multiple diodes, the diodes may be connected in series with each other between the input end EI and the output end EO of the signal conditioner 310 in a similarly forward biased manner.

It should be noted that the diode D1 in the signal conditioner 310 may reduce the voltage of the control signal VCG1 by providing a voltage offset value to generate the control signal VCG2. The voltage offset value is a turn-on voltage of the diode D1. In this way, the turn-on time of the driving transistor M2 corresponding to the control signal VCG2 may be earlier than the turn-on time of the driving transistor M1 corresponding to the control signal VCG1. The signal conditioner 310 can delay the turn-on time of the driving transistor M1 through the generated control signal VCG2.

Figure 5:
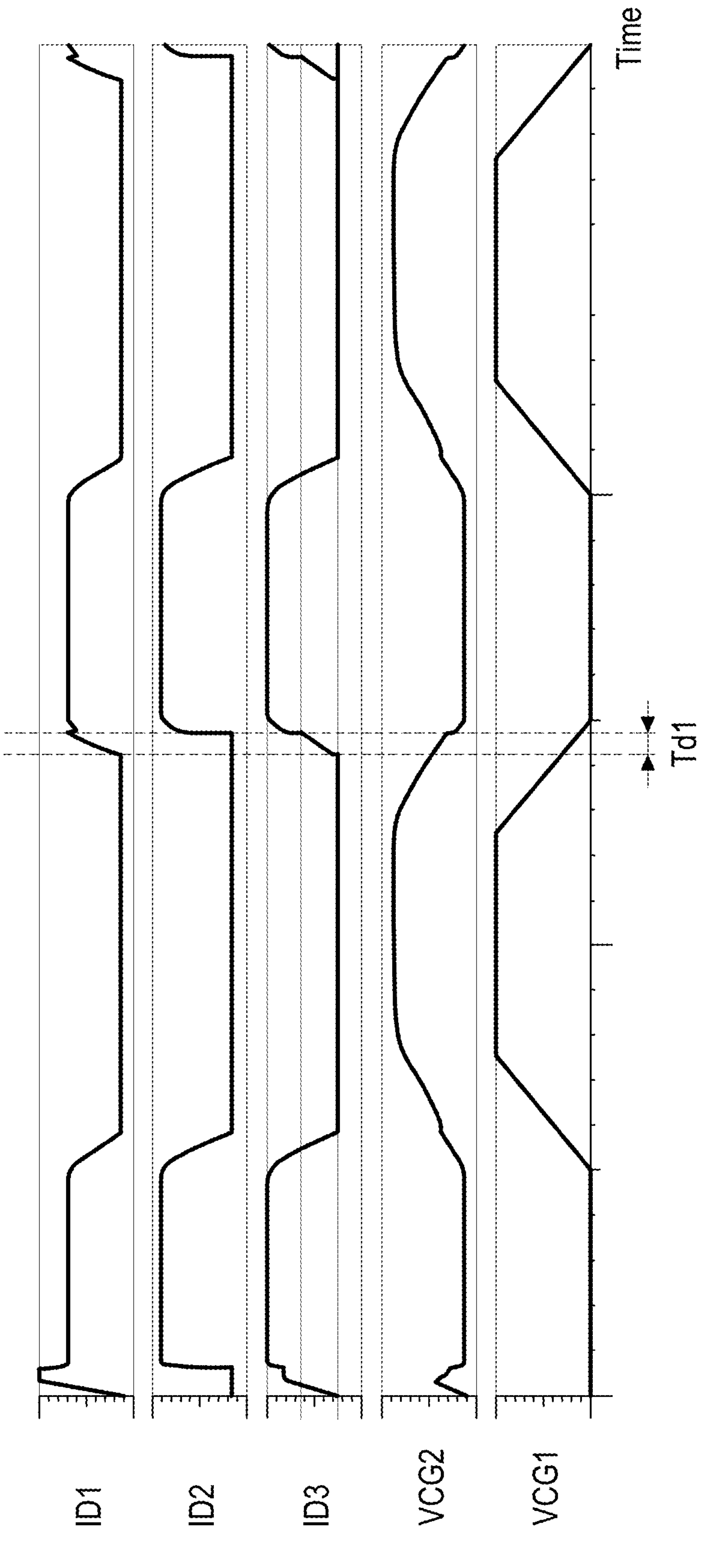
FIG. 5 and FIG. 6 show operation waveform diagrams of the embodiment disclosed in FIG. 3.

Referring to FIG. 3, FIG. 4A, and FIG. 5 at the same time, FIG. 5 shows operation waveform diagrams of the embodiment disclosed in FIG. 3. When the signal conditioner 310 is implemented in the embodiment of FIG. 4A, when the control signals VCG1 and VCG2 are at low voltage levels, the driving transistors M1 and M2 can be turned on and provide the driving currents ID1 and ID2 respectively. Based on the operation of the signal conditioner 310, there may be a time delay Td1 between falling edges of the control signals VCG1 and VCG2. Correspondingly, the driving transistor M1 can be turned on earlier than the driving transistor M2 by the delay time Td1. Thus, the driving current ID1 is generated first, and after the delay time Td1, the driving current ID2 can be generated.

During the delay time Td1, since the driving transistor M2 is not turned on, no current is consumed.

Incidentally, for the light emitting component LD, under the driving requirement of relatively low brightness, the control signal VCG1 can have a relatively small negative pulse wave. Through the action of the signal conditioner 310, the control signal VCG2 may not have time to pull down to a low enough voltage value, so that the driving transistor M2 will not be turned on. This effectively reduces the required power consumption.

In this embodiment, a time delay value provided by the signal conditioner 310 can be adjusted by the designer according to the actual circuit requirements, and there is no fixed limit.

Figure 6:
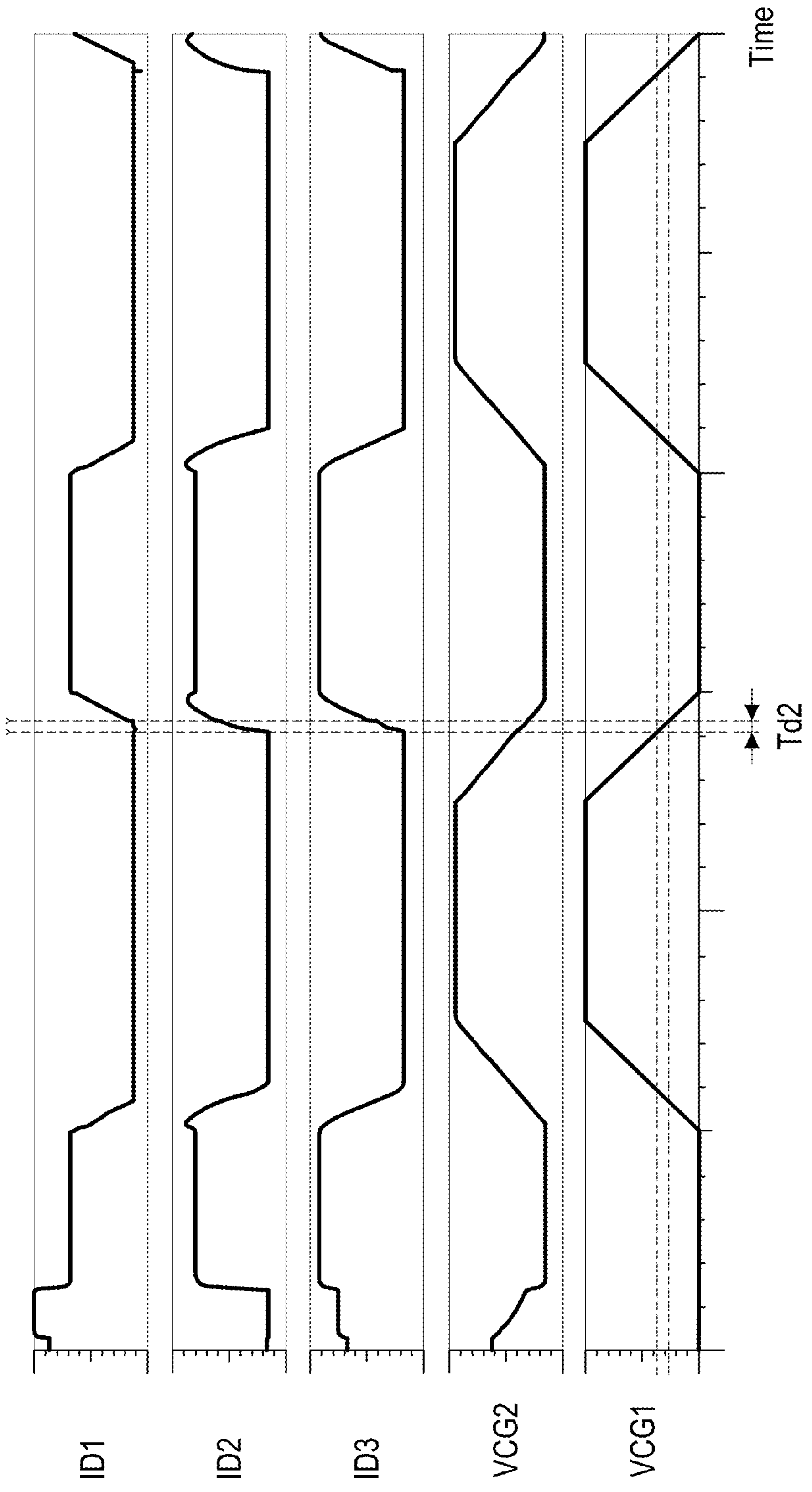

Referring to FIG. 3, FIG. 4B, and FIG. 6 at the same time, FIG. 6 shows operation waveform diagrams of the embodiment disclosed in FIG. 3. When the signal conditioner 310 is implemented in the embodiment of FIG. 4B, when the control signals VCG1 and VCG2 are at low voltage levels, the driving transistors M1 and M2 can be turned on and provide the driving currents ID1 and ID2 respectively. Based on the operation of the signal conditioner 310, a voltage value of the control signal VCG2 may be lower than a voltage value of the control signal VCG1. Thus, there may be a time delay Td2 between time points when the control signals VCG1 and VCG2 are pulled down, and accordingly, the driving transistor M1 can be turned on earlier than the driving transistor M2 by the delay time Td2. Thus, the driving current ID2 is generated first, and after the delay time Td2, the driving current ID1 can be generated. During the delay time Td2, since the driving transistor M1 is not turned on, no current is consumed.

When the number of diodes in the signal conditioner 310 is greater, the time difference between the driving transistor M2 and the driving transistor M1 is turned on is longer.

Figure 7:
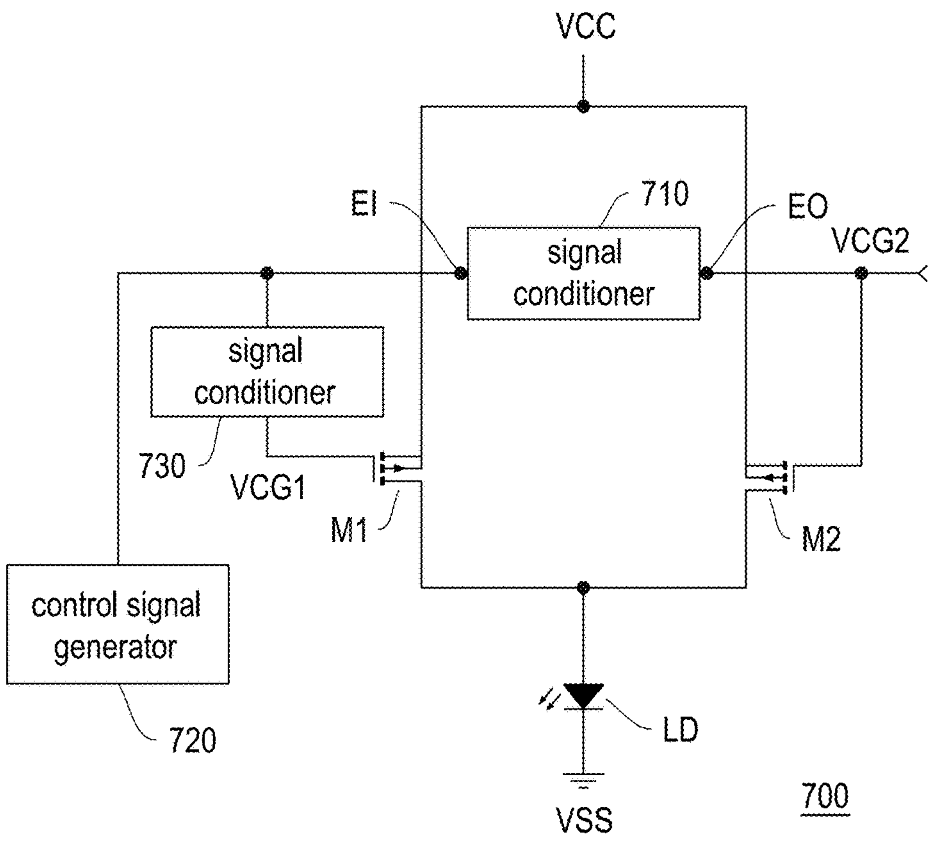
FIG. 7 is a schematic diagram of a driving circuit according to another embodiment of the disclosure.

Referring to FIG. 7, FIG. 7 is a schematic diagram of a driving circuit according to another embodiment of the disclosure. A driving circuit 700 includes the driving transistors M1 and M2, signal conditioners 710 and 730, and a control signal generator 720.

In this embodiment, the driving circuit 700 includes the driving transistors M1 and M2, the signal conditioner 710, and the control signal generator 720, which have been described in detail in the previous embodiment and various embodiments, and therefore will not be repeated in the following.

Different from the previous embodiment, this embodiment further constructs a signal conditioner 730, which is coupled between the signal conditioner 710 and the control end of the driving transistor M1. In this embodiment, the signal conditioner 730 can receive a signal provided by the control signal generator 720 and adjust the signal provided by the control signal generator 720, such as time delay or adjusting an offset voltage value, to generate and provide the control signal VCG1 to the control end of the driving transistor M1.

The signal conditioner 710 also receives the signal provided by the control signal generator 720 and adjusts the signal provided by the control signal generator 720, such as time delay or adjusting an offset voltage value, to generate and provide the control signal VCG2 to the control end of the driving transistor M2.

In some embodiments, the signal conditioner 710 and the signal conditioner 730 are not the resistor R1 or the diode D1 at the same time. For example, if the signal conditioner 710 is the resistor R1, then the signal conditioner 730 is the diode D1. Under this configuration, the driving transistor M2 can be turned on earlier, and the driving transistor M1 can be turned on later. Compared with the embodiment shown in FIG. 3, this embodiment may further increase the time difference between the driving transistor M2 and the driving transistor M1 being turned on, and better achieve the effect of reducing the power consumption of the overall driving circuit.

Figure 8:
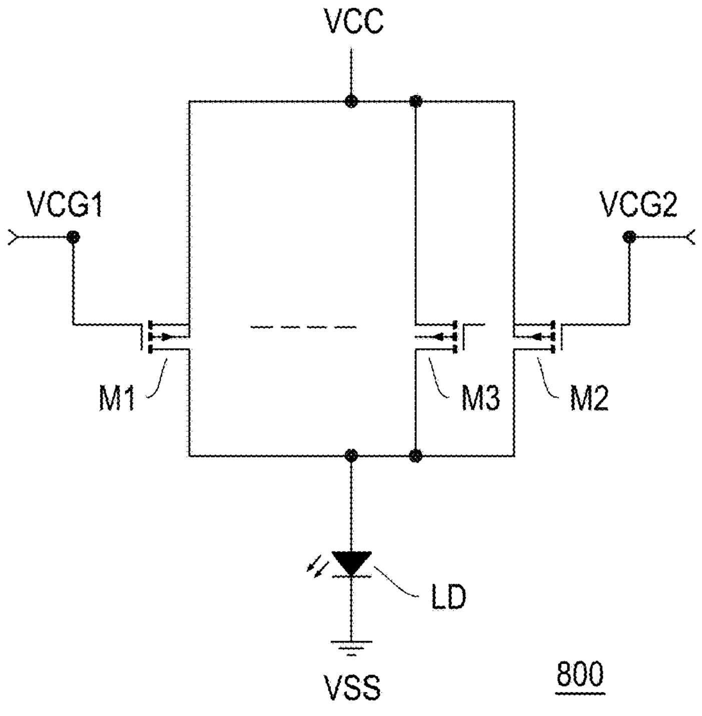
FIG. 8 is a schematic diagram of a driving circuit according to another embodiment of the disclosure.

Referring to FIG. 8, FIG. 8 is a schematic diagram of a driving circuit according to another embodiment of the disclosure. A driving circuit 800 includes multiple driving transistors M1 to M3 connected in parallel and configured to jointly drive the light emitting component LD. The number of the driving transistors M1 to M3 can be three or more, without certain restrictions. By setting multiple driving transistors M1 to M3 to drive the same light emitting component LD, the driving circuit 800 may reduce the current flowing in a single driving transistor M1 to M3, and may effectively reduce the voltage difference between the two ends of each driving transistor. In this way, the total power consumption of the driving transistors M1 to M3 may be effectively reduced to achieve the purpose of energy saving and carbon reduction.

To sum up, the driving circuit of the disclosure uses multiple driving transistors to generate the driving current of the light emitting component. In this way, the current required by a single driving transistor may be reduced, the voltage difference between the two ends of the driving transistor may be reduced, and the power consumption of the driving transistor may be further reduced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A driving circuit, comprising:

a first driving transistor, having a first end to receive a power voltage, a control end of the first driving transistor receiving a first control signal, and a second end of the first driving transistor being coupled to a light emitting component; and a second driving transistor, having a first end to receive a power voltage, a control end of the second driving transistor receiving a second control signal, and a second end of the second driving transistor being coupled to the second end of the first driving transistor, wherein the first driving transistor provides a first driving current to the light emitting component according to the first control signal, and the second driving transistor provides a second driving current to the light emitting component according to the second control signal, wherein a voltage difference between a first end and a second end of the first driving transistor is greater than a threshold voltage of the first driving transistor: a voltage difference between a first end and a second end of the second driving transistor is greater than a threshold voltage of the second driving transistor.

2. The driving circuit according to claim 1, wherein the first driving transistor and the second driving transistor are both P-type transistors, a value of the first driving current is negatively related to a value of the first control signal, and a value of the second driving current is negatively related to a value of the second control signal.

3. The driving circuit according to claim 1, wherein the first control signal is the same as the second control signal.

4. The driving circuit according to claim 1, further comprising a signal conditioner to provide a time delay value or a voltage offset value, wherein the signal conditioner has an input end and an output end, and the signal conditioner comprises:

at least one resistor, coupled between the input end and the output end.

5. The driving circuit according to claim 1, further comprising a signal conditioner to provide a time delay value or a voltage offset value, wherein the signal conditioner has an input end and an output end, and the signal conditioner comprises:

at least one diode, wherein an anode of the at least one diode is coupled to the input end, and a cathode of the at least one diode is coupled to the output end.

6. The driving circuit according to claim 1 further comprising:

a first signal conditioner, wherein an input end of the first signal conditioner is coupled to a control signal generator, and an output end of the first signal conditioner provides the second control signal; and a second signal conditioner, wherein an input end of the first signal conditioner is coupled to the control signal generator, and an output end of the second signal conditioner provides the first control signal.

7. The driving circuit according to claim 6, wherein time delay values provided by the first signal conditioner and the second signal conditioner are different.

8. The driving circuit according to claim 7, wherein either the first signal conditioner and the second signal conditioner comprises:

at least one resistor, coupled between the input end and the output end of the corresponding signal conditioner.

9. The driving circuit according to claim 7, wherein either the first signal conditioner and the second signal conditioner comprises:

at least one diode, wherein an anode of the at least one diode is coupled to the input end of the corresponding signal conditioner, and a cathode of the at least one diode is coupled to the output end of the corresponding signal conditioner.

10. The driving circuit according to claim 1, wherein in a first driving state, both the first driving transistor and the second driving transistor are turned off, in a second driving state, one of the first driving transistor and the second driving transistor is turned on, and the other one is turned off, in a third driving state, both the first driving transistor and the second driving transistor are turned on.

11. The driving circuit according to claim 1 further comprising:

at least one third driving transistor, coupled in parallel with the first driving transistor and controlled by at least one third control signal.

12. The driving circuit according to claim 11, wherein the at least one third control signal is the same as at least one of the first control signal and the second control signal, or the at least one third control signal has a time delay between the first control signal and the second control signal.

13. The driving circuit according to claim 12, wherein the at least one third driving transistor is a P-type transistor.

14. The driving circuit according to claim 1, wherein the light emitting component is a light emitting diode.

* * * * *